United States Patent Office 3,450,227
Patented June 17, 1969

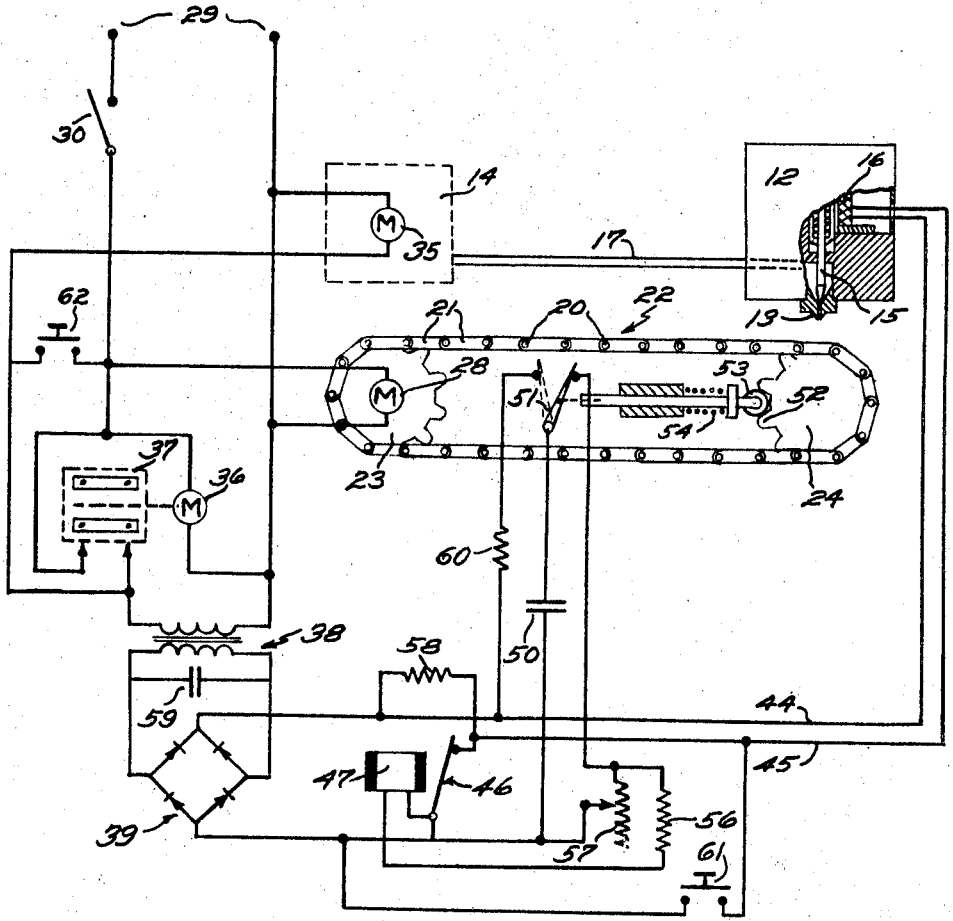

3,450,227
PROGRAMMED LUBRICATION OF BODILY TRAVELING MACHINE PARTS
John R. Montgomery, Trumbull, Conn., assignor to Vitramon, Incorporated, Monroe, Conn., a corporation of Delaware
Filed Dec. 30, 1965, Ser. No. 517,730
Int. Cl. F01m *1/00;* F16n *17/06, 29/00*
U.S. Cl. 184—6                                  7 Claims

ABSTRACT OF THE DISCLOSURE

A liquid dispensing and metering device to dispense a volume of liquid dependent on a given amount of receptacle movement according to a predetermined but variable schedule.

---

This invention relates to an automatic lubricating system especially adapted to dispense spaced series of intermittent charges of lubrication over measured periods of time and to deposit such charges on bodily traveling machine parts such as the pivot pins in an endless chain of traveling links. For convenience of reference an extent of chain travel that brings a link back to its starting point is herein sometimes termed a chain cycle.

It has been proposed to arrange the sprocket wheel of a link chain to cause intermittent pulsing of a valved lubricant ejector, but the lapse of time heretofore occurring between the opening and closing of the ejector valve that causes a spurt of lubricant to be delivered successively to each chain link has been dependent on the speed of chain travel and not sufficiently brief nor accurately controlled to insure lubrication of the moving links of a fast moving chain uniformly and without waste of lubricant.

An object of these improvements is to initiate the occurrence of successive lubricant ejections by means of the travel of the chain, or by motion of some part synchronized therewith, but to make the termination or cutoff of each ejection independent of chain travel.

A contributive object is to make use of an electronic timing circuit to determine the duration of a single ejection of lubricant whereby the amount of lubricant dispensed at each ejection can be varied and controlled independently of the speed of chain travel.

Another object is to limit the number of repetitive ejections of lubricant that will occur in a single series of such ejections so that the series corresponds with a single chain cycle, or some even multiple thereof, whereby to avoid either a shortage or a surplus of lubrication applied to different stretches of the same chain.

Another object is thus to limit the extent of the series of ejections by means of interval timing mechanism that operates separately and apart from the action of the aforesaid electronic timing circuit. Such interval timing mechanism can be set to consume or "count down" a period of time that is equal to that consumed by a single chain cycle, or some even multiple thereof.

Another object is to cause the count down progress of the interval timing mechanism to become arrested simultaneously with any stoppage of the chain travel and subsequently to resume progress from its exact point of arrest simultaneously with resumption of chain travel. This insures that any given stretch of chain shall be uniformly lubricated without gaps between or overlapping of the lubrication applied thereto.

These and other objects of the invention will more clearly appear from the following description of a successful embodiment thereof having reference to the accompanying drawings wherein:

The figure represents schematically bodily traveling machine parts in the form of chain link pivots to be lubricated by means of electrical apparatus and electric circuit components connected in a network embodying the improvements.

The prime components made use of in the embodiment of the invention illustrated in the appended drawings comprise a valved lubricant ejector 12 having a jet delivering nozzle 13 and fed intermittently through tubing 17 with liquid lubricant under pressure from a reservoir tank 14. Flow of the pressurized lubricant to the nozzle 13 within the ejector is controlled by a reciprocative needle valve 15 that is normally spring closed and intermittently opened by the energization of a solenoid 16. Advantageous features of a preferred construction of the ejector are more fully set forth in my copending application, Ser. No. 497,958, filed Oct. 19, 1965 now Patent No. 3,329,347.

The bodily moving machine part that is to be lubricated by ejector 12 is represented herein as the pivot pins 20 of links 21 of a conventional chain 22 that is trained about a sprocket 23 at the left end of the chain and about a sprocket wheel 24 at the right end of the chain. The figure indicates that the nozzle 13 of ejector 12 is above, and directed at, a pivot pin of the chain link that is passing the top center position on sprocket wheel 24, and also indicates that sprocket wheel 23 is driven by a motor 28 which derives alternating current from a supply line 29 containing a master switch 30 which can be manually closed and opened to start and stop the travel of chain 22.

The figure further represents the reservoir tank 14 equipped with a lubricant pressurizing pump which may be conventional and therefore is not shown. A motor 35 powered by the alternating current drives the pump for maintaining pressure of the lubricant in tank 14. Motor 35 is connected in parallel with the chain driving motor 28.

Also in parallel with the aforesaid AC motors 28 and 35 there is a clock motor 36 of the time keeping variety connected directly across the AC supply line 29 constantly to rotate a circuit switching drum 37 to constitute a programming time switch for alternately making and breaking the supply of alternating current from source 29 to the primary of a transformer 38. The secondary of this transformer supplies power to a full wave rectifier 39 from which unidirectional current is derived that powers a chain activated and electronic time delay circuit which automatically determines the frequency and duration of opening of the valve 15 in ejector 12. By this means there is determined the beginning and stoppage of each ejection of lubricant and the volume of lubricant dispensed in each charge thereof when spurted onto the pivot pins of links 21 as they pass the ejector.

The functioning of the aforesaid chain activated and time delay circuit is accomplished by electrical components whose connections are shown schematically in the figure. The valve controlling solenoid 16 in ejector 12 is directly energized from rectifier 39 through service lines 44 and 45, line 45 being interruptible by the make and break contacts of a relay switch 46 that is normally open and can be closed by energizing the solenoid 47 of the relay. Also directly supplied at times with potential from rectifier 39 is a capacitor 50. A double-throw switch 51 is mechanically actuated toward the left by the travel of each tooth 52 on sprocket wheel 24 past a switch thrusting roller 53 so as to shift the movable contact of switch 51 from its full line position to its broken line position for initiating the ejection of a charge of lubricant onto each chain link pivot 20 from the nozzle 13 of ejector 12 as the sprocket wheel turns. As each wheel tooth 52 passes the roller 53 a return spring 54 restores the switch contact to full line position.

Such actuation of the double-throw switch 51 first disconnects capacitor 50 from rectifier 39, by which it may be charged, and connects the capacitor for discharge through a load circuit comprising relay solenoid 47 and a time delay network of resistors 56 and 57. Resistor 57 is adjustable for varying the rate of discharge of capacitor 50 to a point where deenergization of the relay solenoid 47 will permit relay switch 46 to open and cut off the ejection of lubricant from the ejector. There is sufficient current strength at the beginning of the discharge of the capacitor to close the switch contacts of relay 46. This opens the ejector valve 15 but the valve will remain open only until the decay of current supplied by discharge of the capacitor deenergizes solenoid 47 sufficiently to permit the relay switch 46 to open. This instantly deprives the ejector solenoid 16 of the current which holds the ejector valve 15 open.

Thus the period of time that the ejector valve will remain open is initiated by chain travel and becomes a function of the adjustment of resistor 57 which is thus capable of timing the rate of capacitor discharge to very brief intervals such as 80 milliseconds or selectively shorter or longer intervals. The brevity and speed of repetition of lubricant ejection thus made possible enables the delivery and cutoff of successive charges of lubricant to keep pace with even a high speed of travel of chain 22 and thus avoids waste of lubricant which otherwise would result from delivery of lubricant to points on the chain that do not need lubrication.

There may be introduced into the time delay circuit a damping resistor 58 connected across the ejector supply lines 44 and 45, and another capacitor 59 bridging the rectifier 39. Various other parameters such as a resistor 60 may be introduced to suit the electrical characteristics of the circuitry.

The intermittent ejections of lubricant delivered to the traveling chain 22 are divided into series, and the number of ejections in each series should equal the number of spots on the chain that are to be lubricated during a single chain cycle, or some even multiple thereof. The time consumed by each series of ejections is limited by the arrangement of conductive contacts on the insulative drum 37 and the rotary speed of the drum as driven by motor 36. This is likewise true of the time that elapses between each series of ejections. The duration of a single series of ejections, termed the lubricating period, may for instance be twenty minutes, and preferably equal to the time consumed by one cycle of chain travel, while the period between the lubricating periods, termed the idle period, may for instance be four hours and preferably equal to the time consumed by an even multiple of chain cycles.

As an example of use of the lubricating system above described it can be assumed that the chain 22 supports, and/or impels, an endless belt or conveyor carrying work that is to be heat treated into and out of a processing oven the heat of which dries out and requires regular and frequent lubrication of the chain link pivots 20. Just prior to the arrival of a pivot pin 20 at the top center of sprocket wheel 24 one of the sprocket teeth 52 shifts the thrust roller 53 of double-throw switch 51 toward the left to charge capacitor 50 from the rectifier power source 39. As the sprocket tooth continues its travel, switch contact 51 is caused to return toward the right by the spring 54 and opens the capacitor charging circuit and closes the capacitor discharging circuit just as one of the pivot pins 30 arrives at the top center of sprocket wheel 24 in the path of a spurt of oil to be delivered to it from the nozzle 13 of ejector 12. At the same time, the solenoid valve 15 in the ejector is opened to initiate the ejection of the spurt of oil because the discharge of the capacitor energizes the solenoid 47 and closes the contacts of relay switch 46 thereby delivering an energizing impulse to the valve solenoid 16. Immediately the decay of current derived from the capacitor deenergizes relay solenoid 47 and permits the relay contacts to open thereby deenergizing valve solenoid 16 and terminating the spurt of oil from the ejector after a very brief interval, as small or smaller than 80 milliseconds if desired.

This activation of the ejector 12 should continue until a series of such activations has occurred totaling an even multiple of the number of link pivots that pass the ejector 12 during one complete cycle of chain travel. Thus each link pivot in the chain is assured at least one spurt of the lubricating oils during each chain cycle.

Consecutive activating of the ejector can continue only as long as the rectifier 39 is energized from the supply line 29 by the constantly rotating commutator type drum 37. Preferable the speed of programming motor 36 shall be such that this drum alternately makes and breaks the rectifier circuit for periods equal to the time consumed by one of more complete cycles of the chain depending on the needed frequency of lubrication of the latter.

It is important if the chain stops and then resumes traveling, as would result from opening and later closing master switch 30, that the programming motor 36 shall stop and resume running simultaneously and for equal intervals of time. Thus the beginning and end of a series of lubricating ejections will not lose synchronism with the respective cycles of travel of the chain, and no link will receive any greater or less amount of lubricant than any other link in the chain.

Since it would be useless for the pump motor 35 to run during the cut-off of current from the supply line 29 to the rectifier, motor 35 is likewise connected to be energized and deenergized by the programming drum 37 respectively at the same times the rectifier 39 is energized and deenergized.

It is sometimes desired to test the readiness of the system to function automatically when the programming switch drum 37 is positioned to break the power supply circuit and the relay switch 46 is open, in other words in the idle period that elapses between each series of ejections. For that purpose there are provided normally open push button switches such as 61 and/or 62, the closing of which will momentarily shunt past the then open switches 46 and 37 and energize the ejector 12 to cause a spurt of oil if the system is in proper order to do so. Switches 46 and 37 might be combined electrically and/or mechanically to be closed simultaneously by a single push button.

There may be substituted for the programming time switch 36, 37 many more elaborate and sophisticated forms of programming devices such as alternately running, count-down timers that are easily adjustable to vary the intervals of time involved in their count-down function and that are manually or automatically resettable in order to start their individual count-down operation from zero. The time relationship of such modifications to the cycles of travel of the chain being lubricated will preferably be like that explained for the simple programming timer 36, 37 herein disclosed.

These and many other variations of structure and relationship of elements of the system will be suggested to those skilled in the art by the present disclosure and the appended claims are directed to and intended to cover all such alternatives as come within a broad interpretation of the wording of the claims.

What is claimed is:

1. In a lubricating system the combination with a bodily traveling machine part to be lubricated of a lubricant ejector directed at the path of travel of said machine part operable by electrical activation to deliver a charge of lubricant to said part, means operated in synchronism with travel of said machine part operative to initiate said electrical activation, and a time delay circuit, and circuit components electrically connected to said ejector independently of the travel of said machine part, in which the said machine parts to be lubricated are links of an endless chain performing successive cycles of travel, and in which the said source of electrical potential is a rectifier, together with a supply circuit energized by alternating current and feeding same to said rectifier, said supply circuit containing a power motor mechanically connected to impel said chain at a constant speed of travel and also containing a programming motor of constant timekeeping speed synchronously related to said speed of chain travel, and programming contacts connected to alternately make and break the timing portion of said supply circuit and operated by said programming motor at the completion of one or more complete cycles of chain travel.

2. In a lubricating system the combination defined in claim 1, together with a reservoir of liquid lubricant, a conduit leading said lubricant to the said ejector, a pump operative to maintain said lubricant under pressure in said reservoir, and a motor in the said supply circuit supplied with current through the said programming contacts and operative to drive said pump.

3. In a lubricating system the combination defined in claim 1, together with a transformer interposed between the said supply circuit and the rectifier.

4. In a lubricating system the combination defined in claim 3, together with a master switch connected to energize and deenergize the said supply circuit and thereby simultaneously immobilize the said chain and the said programming motor.

5. A lubricating system as defined in claim 1 wherein the circuit components include a capacitor alternately connectable to a source of electrical potential and to the time delay circuit.

6. A lubricating system as defined in claim 5 further comprising a switch arranged to be activated by travel of the machine part to operatively connect the capacitor to either the source of electrical potential or to the time delay circuit.

7. A lubricating system as defined in claim 5 wherein the time delay circuit includes components of variable impedance for selectively determining the rate of discharge of the capacitor.

References Cited

UNITED STATES PATENTS

| | | |
|---|---|---|
| 2,138,243 | 11/1938 | Nicolaus. |
| 2,558,370 | 6/1951 | Miller. |
| 3,065,775 | 11/1962 | Keves _____ 141—160 X |
| 3,280,860 | 10/1966 | Schneider et al. _____ 141—160 |
| 3,165,171 | 1/1965 | Baeriswyl _____ 184—3 |

OTHER REFERENCES

Turner, R. P.: Delay and Timing Circuits, in Radio News, August 1943, p. 32.

LAVERNE D. GEIGER, *Primary Examiner.*

EDWARD J. EARLS, *Assistant Examiner.*

U.S. Cl. X.R.

184—15; 317—141, 151